(12) United States Patent
Emerick (10) Patent No.: US 9,845,147 B2
(45) Date of Patent: Dec. 19, 2017

(54) RECESSED LIFT SPOILER ASSEMBLY FOR AIRFOILS

(71) Applicant: Northrop Grumman Systems Corporation, Falls Church, VA (US)

(72) Inventor: Mark F. Emerick, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 313 days.

(21) Appl. No.: 14/262,647

(22) Filed: Apr. 25, 2014

(65) Prior Publication Data

US 2016/0137290 A1    May 19, 2016

Related U.S. Application Data

(60) Provisional application No. 61/818,395, filed on May 1, 2013.

(51) Int. Cl.
*B64C 21/02* (2006.01)
*B64C 39/10* (2006.01)

(52) U.S. Cl.
CPC .............. *B64C 21/02* (2013.01); *B64C 39/10* (2013.01); *B64C 2039/105* (2013.01); *B64C 2230/06* (2013.01); *Y02T 50/166* (2013.01)

(58) Field of Classification Search
CPC .. B64C 9/32; B64C 9/323; B64C 9/26; B64C 9/146; B64C 21/00; B64C 21/02; B64C 2230/08; B64C 2230/20; B64C 2230/24; B64C 9/14; B64C 9/143; B64C 21/04; B64C 21/06; B64C 21/08; B64C 21/10;
(Continued)

(56) References Cited

U.S. PATENT DOCUMENTS 2,034,218 A   3/1936   Weick et al.
2,073,318 A   3/1937   Peel
(Continued)

OTHER PUBLICATIONS

Olsman, Willem F.J., Influence of a cavity on the dynamical behaviour of an airfoil, 2010, pp. 1-165, Universiteitsdrukkerij TU Eindhoven, Eindhoven, The Netherlands.
(Continued)

*Primary Examiner* — Joseph W Sanderson
*Assistant Examiner* — Christopher D Hutchens
(74) *Attorney, Agent, or Firm* — Stetina Brunda Garred and Brucker (57) ABSTRACT

A spoiler assembly is provided that is engageable to a UAV that defines a body, an outer surface and an inner surface. The spoiler assembly comprises a spoiler, translatably connected to the UAV inner surface adjacent a first portion of the spoiler aperture. The spoiler defines an upper surface and an outer surface, the upper surface being substantially the same size and shape as the spoiler aperture. A spoiler shroud is connected to the UAV inner surface and extends within the UAV body about at least a portion of the spoiler aperture. A spoiler activating mechanism is secured to the UAV inner surface and connected the spoiler lower surface. The mechanism is operative to translate the spoiler between a first position wherein the spoiler upper surface is substantially flush with the UAV outer surface, and second a position, wherein the spoiler upper surface is disposed substantially within the UAV body.

27 Claims, 7 Drawing Sheets

(58) Field of Classification Search
CPC .............. B64C 2230/06; B64C 39/10; B64C 2039/105; B64C 23/06; B64C 5/10; B64C 5/12
See application file for complete search history.

(56) References Cited

U.S. PATENT DOCUMENTS

| | | | | |
|---|---|---|---|---|
| 2,322,745 | A * | 6/1943 | Rogallo | B64C 21/02 244/90 A |
| 2,541,704 | A | 2/1951 | Koppen | |
| 2,549,044 | A * | 4/1951 | Ashkenas | B64C 9/32 244/90 A |
| 2,549,045 | A * | 4/1951 | Ashkenas | B64C 21/02 244/203 |
| 2,557,829 | A | 6/1951 | Lavelle | |
| 2,678,784 | A * | 5/1954 | Lanier | B64C 21/02 244/204 |
| 2,852,211 | A | 9/1958 | Xenakis | |
| 2,987,277 | A | 6/1961 | Richardson et al. | |
| 5,598,990 | A * | 2/1997 | Farokhi | B64C 23/06 244/198 |
| 5,697,468 | A | 12/1997 | Russell, Jr. et al. | |
| 6,105,904 | A | 8/2000 | Lisy et al. | |
| 7,143,983 | B2 | 12/2006 | McClure | |
| 7,997,538 | B2 | 8/2011 | Osborne et al. | |
| 8,016,560 | B2 * | 9/2011 | McGrath | F03D 1/0633 416/231 B |
| 8,061,986 | B2 * | 11/2011 | Xiong | F03D 1/0633 244/204.1 |
| 8,251,317 | B2 | 8/2012 | Pitt | |
| 2004/0144893 | A1 | 7/2004 | Clark | |
| 2009/0230240 | A1 * | 9/2009 | Osborne | B64C 9/32 244/87 |
| 2010/0163670 | A1 * | 7/2010 | Dizdarevic | B64C 1/0009 244/36 |
| 2013/0020432 | A1 * | 1/2013 | Yogev | B64C 9/12 244/51 |
| 2013/0068894 | A1 | 3/2013 | Musters | |

OTHER PUBLICATIONS

Extended European Search Report, Reference EPP7439, Application No. PCT/US2014/035699, dated Sep. 19, 2016, 10 pages.

* cited by examiner

FIG. 6B    RECESSED LIFT SPOILER-CLOSED POSITION

FIG. 7    RECESSED LIFT SPOILER—CLOSED POSITION

FIG. 8

RECESSED LIFT SPOILER-OPEN POSITION

FIG. 9

RECESSED LIFT SPOILER ASSEMBLY FOR AIRFOILS

CROSS-REFERENCE TO RELATED APPLICATIONS

This application claims priority to U.S. Provisional Patent Application No. 61/818,395, filed May 1, 2013, aspects of which are incorporated hereto.

STATEMENT RE: FEDERALLY SPONSORED RESEARCH/DEVELOPMENT

This invention was made under government support under Contract No. FA8650-12-C-7227 awarded by U.S. Air Force Research Laboratory. The government has certain rights in the invention.

BACKGROUND

The present invention relates to devices for regulating the flight characteristics of airfoils and, more particularly, to use of a spoiler mechanism operative to selectively disrupt airflow across the airfoil upper surface to regulate the lift characteristics of the airfoil in flight.

Lift characteristics of an airfoil depend on a variety of features, including the size and shape of the wing, and other factors. Lift characteristics are important factors in determining performance characteristics of an aircraft, such as range, payload, and engine requirements. By designing an airfoil to have high lift characteristics, engine requirements may be reduced. Range and pay load characteristics may also be extended as a result of lift characteristics. Consequently, there are good reasons to design an airfoil to have high lift characteristics.

Some aircraft, such as unmanned aerial vehicles (UAVs), are designed to optimize lift, range, and payload characteristics, while avoiding the need for powerful, heavy engines and control mechanisms. This allows a UAV to fly substantial distances, and loiter for extended periods, without running out of fuel.

There are, however, circumstances where high lift characteristics may introduce problems in the operations of such vehicles. For example, one of the critical phases of UAV flight is landing, or other recovery, e.g., by flying into a net. High lift characteristics of the UAV may dictate that the UAV descent angle, or glide angle, is relatively shallow such that the UAV takes considerable time and distance before it is able to descend from its operating altitude to a landing or capture location. Indeed, such characteristics may preclude landing the UAV at locations where such glide angles are inconsistent with the terrain or other operating conditions, i.e., where a steeper descent angle is necessary, or otherwise more advantageous.

Accordingly, while the advantages of a high lift vehicle may enhance certain operating characteristics of various types of aircraft, there are circumstances where those lift characteristics need to be altered in order to achieve more optimum operation of the aircraft. Preferably that alteration may be done in a temporary manner during only a portion of the flight profile.

Lift characteristics can be modified by creating an interference, or airflow protuberance, which cause disturbance or perturbation of airflow about the wing upper surface. The desired perturbation causes the flow to separate from the top of the airfoil and a controlled aerodynamic stall condition to occur over the portion of the airfoil behind the lift spoiler. This greatly reduces the lift produced by that section of the airfoil.

Various proposals have been made to introduce such protuberances. One approach is to provide a spoiler mechanism that translates to a position above the wing, into the flow, where it impedes the airflow across the wing, causing the boundary layer to separate from the top of the airfoil which results in reduced lift. While such a technique is useful for its intended function, it requires that the spoiler translate to a position in the airflow where it is exposed to, and must withstand the force of airflow across the wing. The structure and power requirements to withstand such forces typically results in the need to use stronger motors and more sturdy mechanisms that are relatively heavy and expensive. In the case of some light aircraft, such as UAVs, those requirements can be prohibitive.

Another approach has been to provide a porous surface along a portion of the airfoil upper surface. When an adjacent inner surface is translated a proper distance, the porous upper surface is opened to an inner cavity to allow airflow through. That airflow disturbs the airflow across the airfoil upper surface and decreases lift. Again, such mechanisms are suitable for their purpose, but suffer from limitations. For example, the mechanism for translating the inner surface may be difficult to precisely maintain and operate. Moreover, airflow patterns across the wing may encounter interference, even when the perforations are closed, due to the irregularities in the outer surface and spacing between the outer surface and the translatable inner surface. Further, where low observability characteristics are desired, it is preferable to avoid surface irregularities that may detract from those characteristics.

Accordingly, it is desirable to provide an airfoil that, in normal operation, exhibits high lift characteristics, but may also include a mechanism that is operative to selectively introduce drag that reduces the lift characteristics, and allows for different modes of operation, without significantly adding to the weight requirements or significantly degrading the low observability characteristics.

It is preferable that such an airfoil be constructed in a manner such that, in normal flight, the outer surface is uninterrupted by any surface irregularities, and that deployment of the spoiler mechanism does not require that any structure be extended directly into the airflow, which could impose significant weight/cost penalties and degrade low observable characteristics.

These and other objects and advantages are addressed and achieved in accordance with the present invention, as described and illustrated herein.

BRIEF SUMMARY

A spoiler assembly is provided that is engageable to an unmanned aerial vehicle (UAV) defining a UAV blended wing body having a center body portion and outboard wing portions, UAV outer surface and UAV inner surface. The spoiler assembly comprises a spoiler, translatably connected to the UAV inner surface adjacent a first portion of the spoiler aperture. The spoiler defines a spoiler upper surface and a spoiler lower surface, the spoiler upper surface being substantially the same size and shape as the spoiler aperture. A spoiler shroud is connected to the UAV inner surface and extends within the center body portion of the UAV blended wing body about at least a portion of the spoiler aperture. A spoiler activating mechanism is secured to the UAV inner surface and connected to the spoiler lower surface, the spoiler activating mechanism is operative to translate the spoiler between a first position wherein the spoiler upper surface is substantially flush with the UAV outer surface, and a second position, wherein the spoiler upper surface is disposed substantially within the UAV blended wing body.

The system is designed such that the boundary layer of the flow along the top of the airfoil will remain attached when the UAV is in flight and the spoiler is in the first position. When the UAV is in flight and the spoiler is in the second position, the resulting airflow perturbation will cause the flow to separate from the top of the airfoil and a controlled aerodynamic stall condition to occur over the portion of the airfoil behind the lift spoiler. This greatly reduces the lift produced by that section of the airfoil.

When the UAV is in flight and the spoiler is in the second position, the resulting flow perturbation adjacent to the spoiler aperture will cause the flow to separate from the top of the airfoil, aft of the spoiler aperture. This reduces the lift produced by that section of the airfoil. The reduced lift characteristics allow the UAV to descend more rapidly than occurs when the spoiler assembly is disposed in the first position. The extent of the perturbation may be regulated by adjusting the position of the lift spoiler, and by the size of the spoiler. The perturbation may be designed to cause a controlled aerodynamic stall condition to occur over the portion of the airfoil behind the lift spoiler. This greatly reduces the lift produced by that section of the airfoil.

In the presently preferred embodiment the spoiler is hingedly connected to the UAV inner surface about the first side of the spoiler aperture, and the spoiler shroud is connected to the UAV inner surface about second, third, and fourth sides of the spoiler aperture. The spoiler shroud may further define a spoiler receiving seat. When the spoiler translates to the second position, the spoiler lower surface is substantially disposed against and may be supported by the spoiler receiving seat.

When the spoiler is disposed in the second position, the spoiler and the spoiler shroud collectively define a wedge shape cavity within the UAV body.

In the presently preferred embodiment, the UAV outer surface defines a low observable surface when the spoiler is disposed in the first position, and when the spoiler is disposed in the second position.

The UAV may also utilize other types of control surfaces such as: ailerons, elevators, elevons, and rudders as required to control the UAV during flight with the spoilers in either position. The spoilers are designed to be able to be independently controllable, as required to achieve the desired flight performance. However, all of the flight control surfaces including the spoiler mechanism may also be collectively regulatable by a UAV flight control computer, which allows the UAV to fly and land autonomously.

In another embodiment, the UAV flight control computer is in communication with and regulated by a remote controller.

In the presently preferred embodiment the UAV is a tailless vehicle, formed to have a blended wing body. However, it is to be understood that the present invention has application with respect to UAVs of different shapes and construction. Moreover, the present invention also has application for other airfoils, including but not limited to manned aircraft.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein, including various ways of regulating the operation or position of the spoiler and the spoiler assembly. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
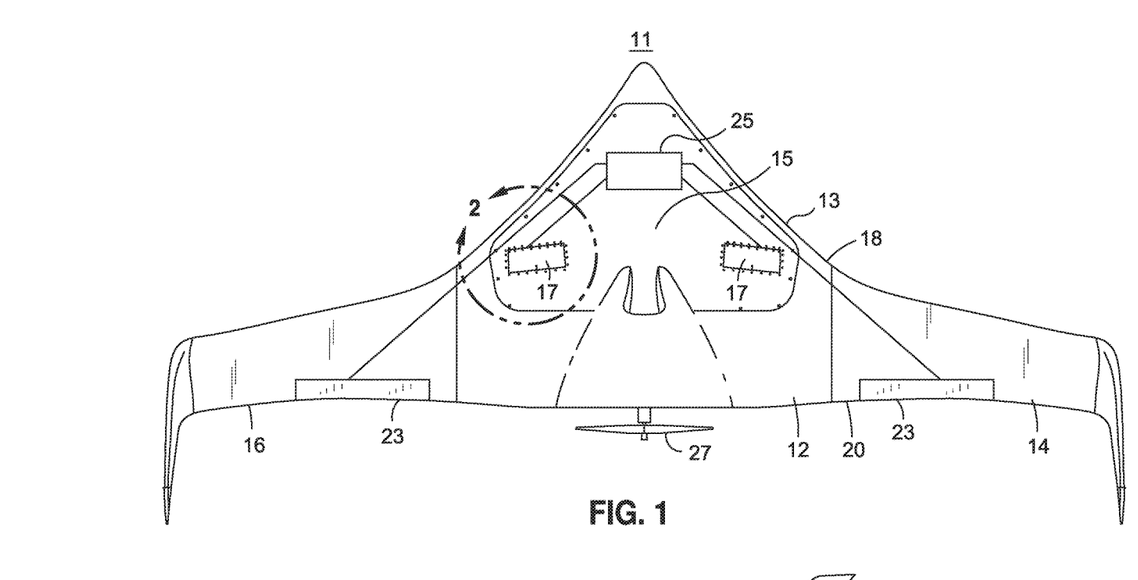
FIG. 1 is a top view of an airfoil having a pair of spoiler assemblies disposed therein.
Figure 2:
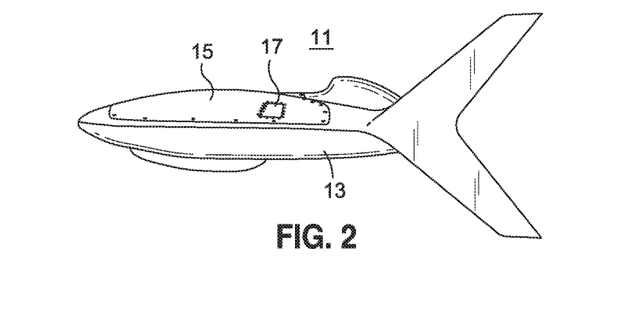
FIG. 2 is a side view of the airfoil as shown in FIG. 1.

Referring to FIGS. 1 and 2 of the drawings, UAV 11 is shown. The UAV 11 includes a body 13 and an upper surface portion 15. The body 13 includes a center body portion 12 and outboard wing portions 14, 16. Spoilers 17 are disposed in apertures 19 (shown at FIG. 9) formed in the upper surface portion 15 of the UAV center body portion 12, intermediate the UAV leading edge 18 and the trailing edge 20. The spoilers 17 functions in response to control signals from flight control computer 25. Elevons 23 are also operated in response to control signal from flight control computer 25. In the presently preferred embodiment the spoilers 17 are formed as non-porous structures.

In operation, the flight control computer 25 operates to independently control the translation of each spoiler 17. The computer 25 may also operate to collectively regulate the operation of spoilers 17 and elevons 23, either autonomously, or in response to control signals received from a remote location, to achieve the desired navigation and maneuverability. UAV 11 is powered by an onboard motor, which operates to rotate propeller 27 disposed at the rear of UAV 11.

Figure 3A:
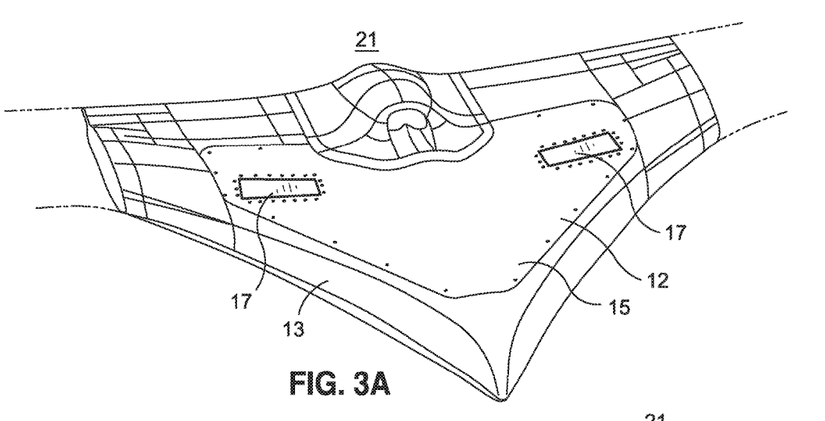
FIG. 3a is a perspective view of an alternate airfoil showing the spoilers in the closed position.
Figure 3B:
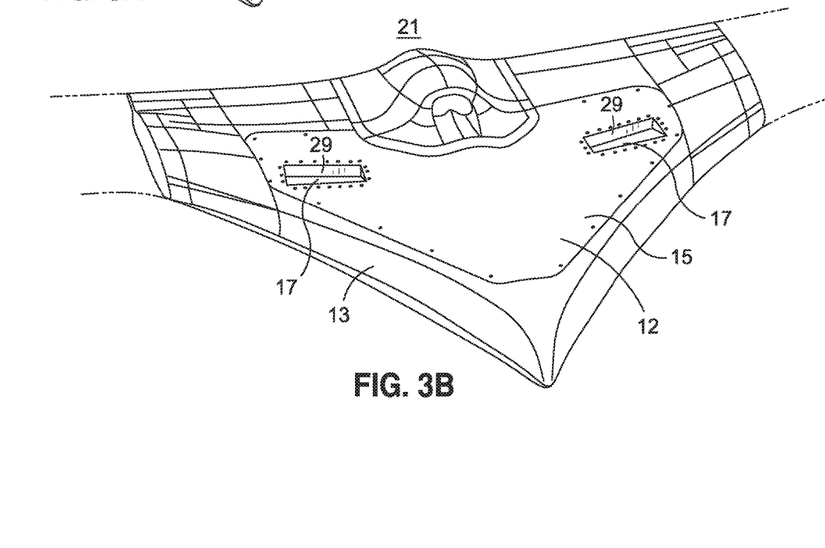
FIG. 3b is a perspective view of an alternate airfoil having a pair of spoiler assemblies, with the spoilers shown in the open position.

FIGS. 3a and 3b illustrate an alternate construction of a UAV. As shown therein, UAV 21 includes a body 13 and an upper surface 15. Spoilers 17 are disposed in apertures formed in the upper surface 15 of UAV 21.

FIG. 3a illustrates the spoilers 17 disposed in a closed position, wherein the spoilers are formed to be substantially flush with the contours of the UAV upper surface 15.

FIG. 3b illustrates the spoilers 17 disposed in an open, or recessed position, wherein the spoilers 17 extends into the UAV body 13, to define a wedge shaped cavity 29 within the UAV body 13. In the presently preferred embodiment the cavity 29 is a substantially closed to the UAV body 13. However, cavity 29 may alternatively be formed to be open to the interior of UAV body 13, or portion thereof.

Figure 4:
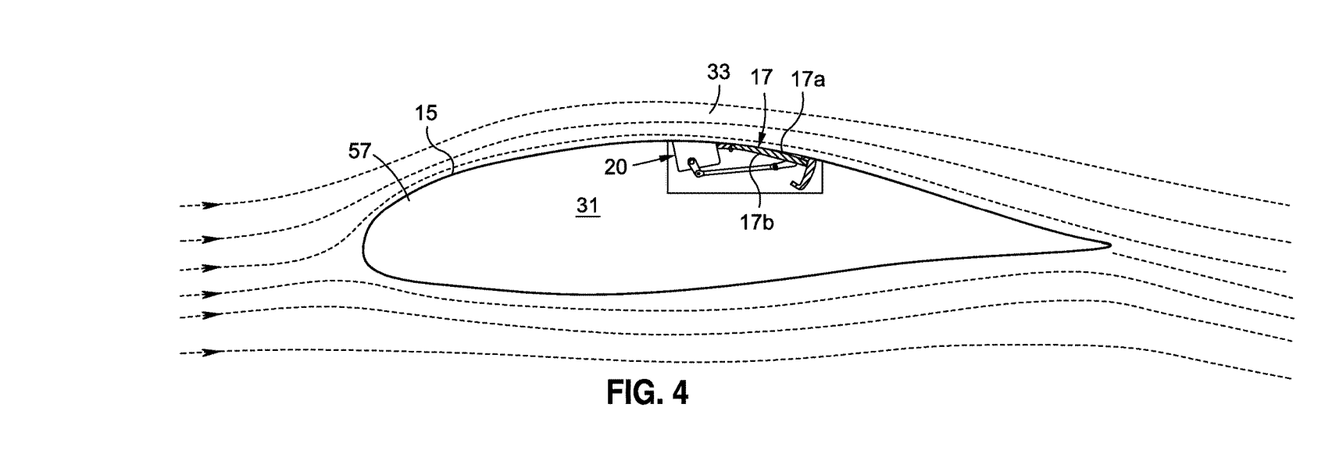
FIG. 4 is a side view showing airflow across an airfoil having a spoiler in the closed position.
Figure 5:
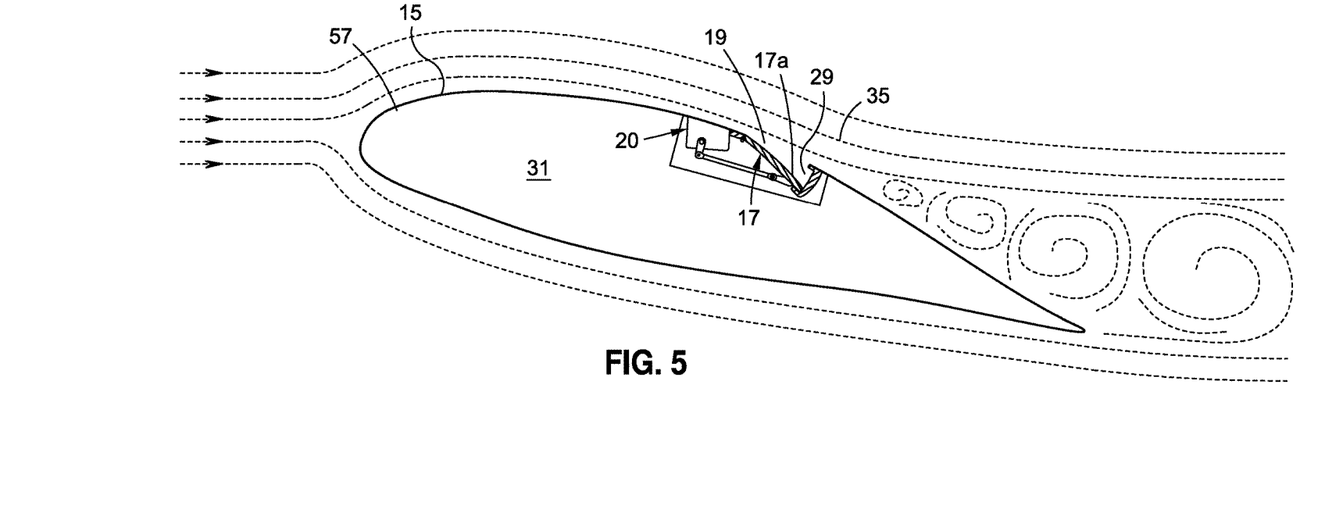
FIG. 5 is a side view showing airflow across an airfoil having a spoiler assembly in the open position.

FIGS. 4 and 5 illustrate airflow across an airfoil body 31 having a spoiler assembly 20 disposed therein.

When the spoiler 17 is disposed in a closed position, as shown at FIG. 4, the non-porous spoiler upper surface 17a is substantially flush with the upper surface portion 15 of airfoil 31. Under such conditions, the airflow 33 across the airfoil upper surface 15 is substantially smooth and uninterrupted, contributing to high lift characteristics of the airfoil.

FIG. 5 illustrates the airfoil 31 wherein the spoiler 17 is disposed in the open position, such that the spoiler 17 is recessed within the airfoil body 57, to define a substantially wedge shaped cavity 29 within the body 57. The translation of spoiler 17 to the open, or recessed position, causes flow to separate from the top surface of the airfoil 15, aft of the spoiler aperture. This reduces the lift produced by that section of the airfoil 31. The extent of the perturbation may be regulated by adjusting the position of the lift spoiler, and by the size of the spoiler. The perturbation may be designed to cause a controlled aerodynamic stall condition to occur over the portion of the airfoil behind the lift spoiler. This greatly reduces the lift produced by that section of the airfoil.

Figure 6A:
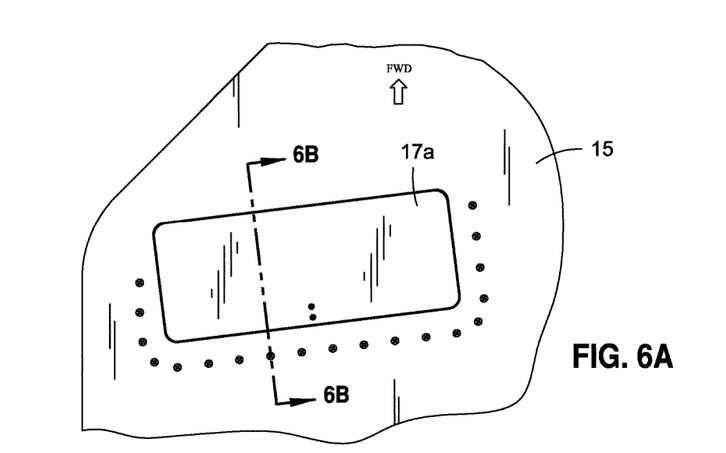
FIG. 6a is a top view of an airfoil surface with a spoiler assembly in the closed position.

FIG. 6a is an enlarged view of airfoil upper surface 15, with spoilers upper surface 17a being flush mounted therewith.

Figure 6B:
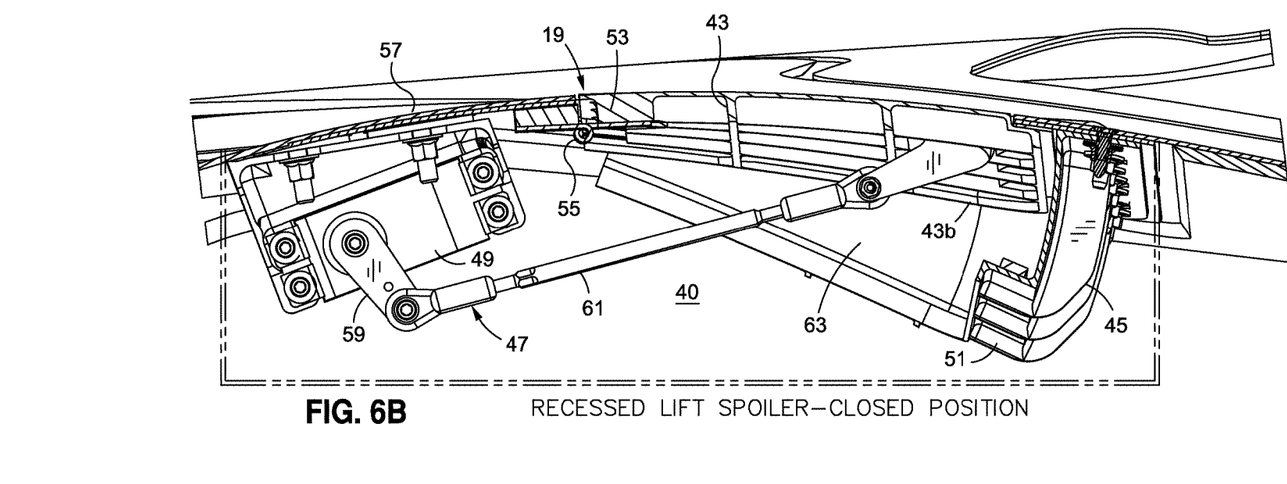
FIG. 6b is a sectional view of a spoiler assembly, showing the spoiler in the closed position.

FIG. 6b is a sectional view of the spoiler assembly 40 disposed interior to the airfoil body. As shown in FIGS. 6b-9, the spoiler assembly 40 includes a spoiler 43 translatably disposed within the aperture 19. The spoiler 43 includes a lower surface portion 53, which is secured to hinge 55, which in turn is secured to the airfoil body 57.

Figure 7:
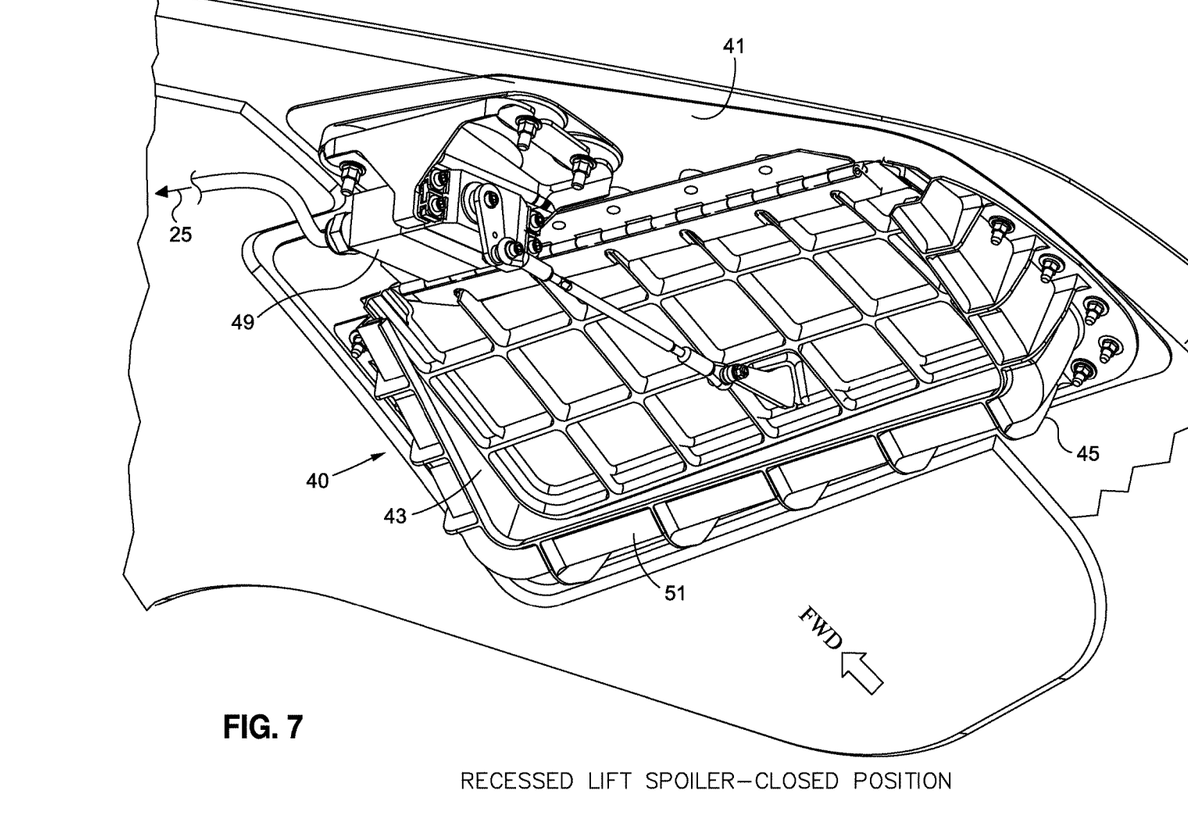
FIG. 7 is a bottom perspective view of the spoiler assembly shown in FIG. 6b.
Figure 8:
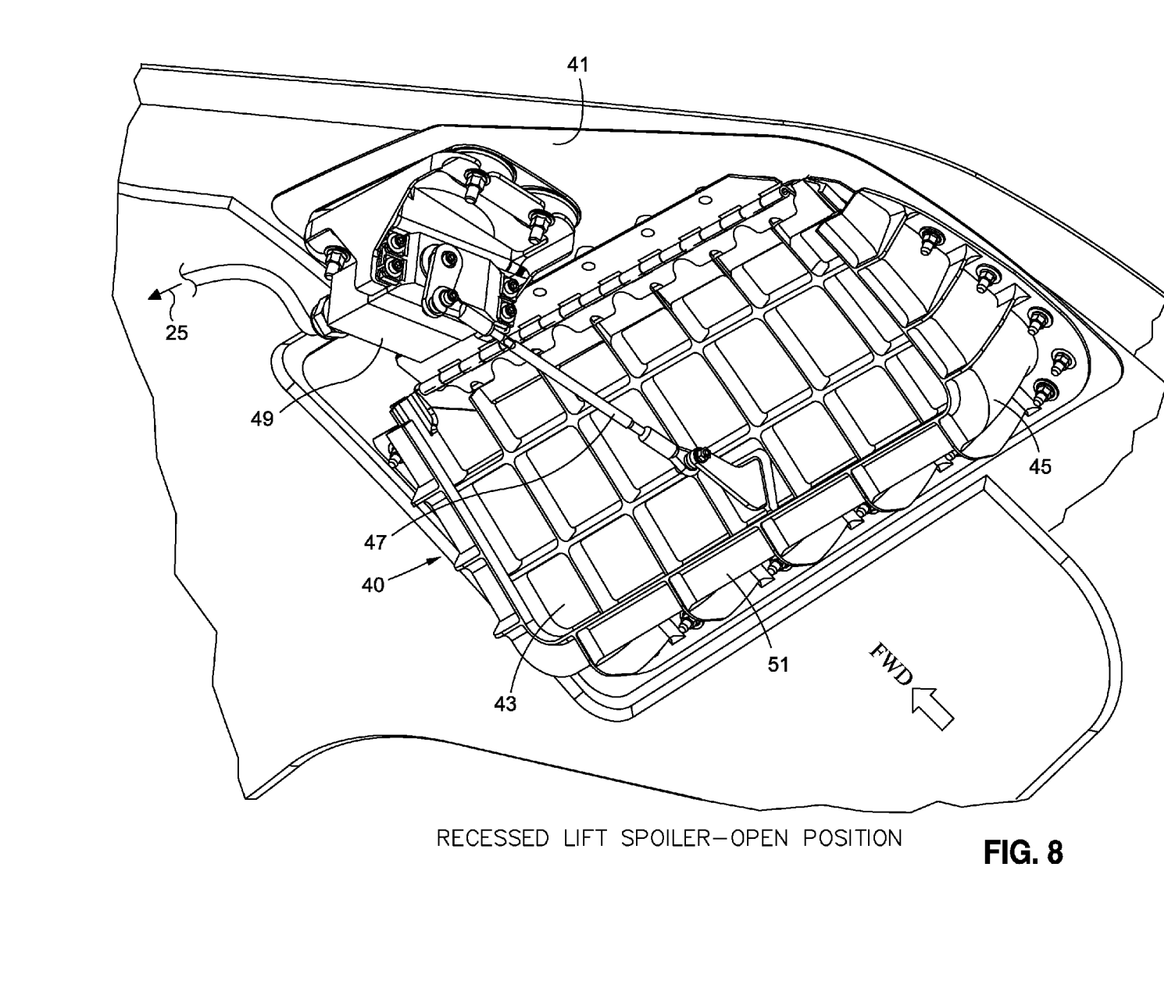
FIG. 8 is a bottom perspective view of a spoiler assembly, showing the spoiler assembly in the open position.
Figure 9:
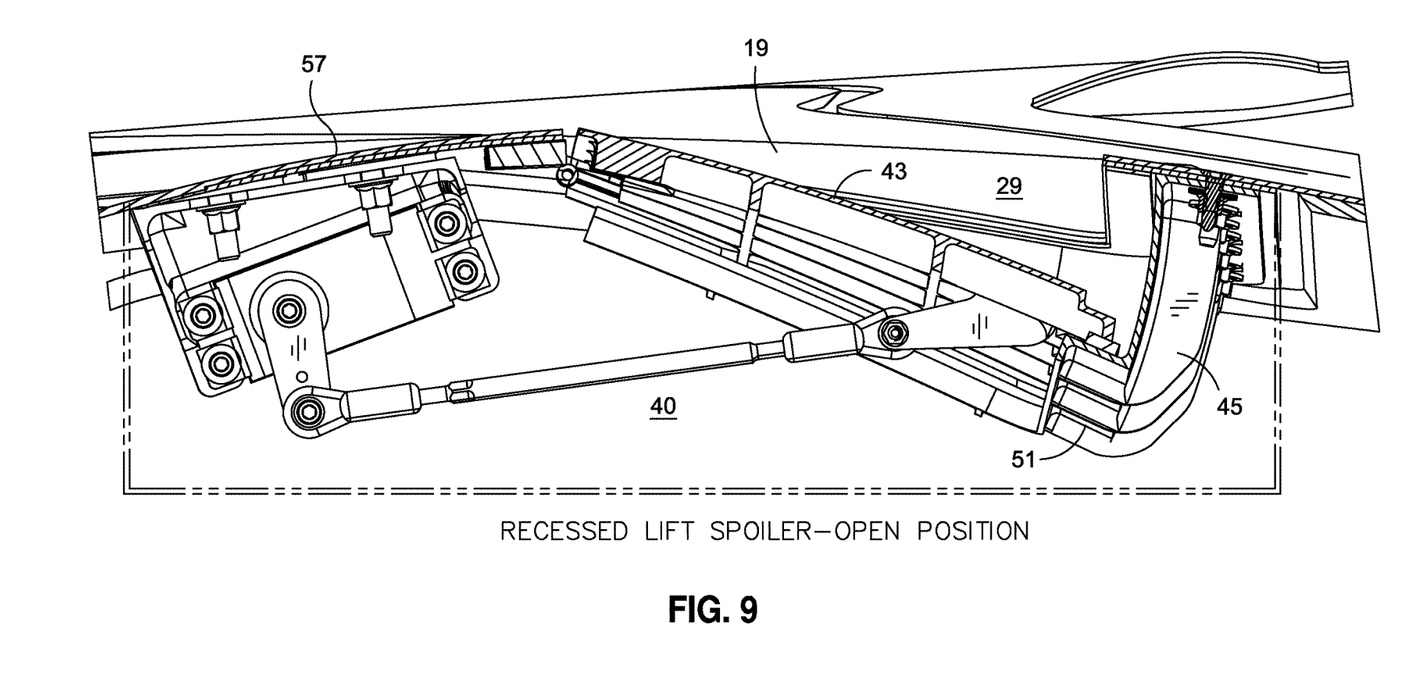
FIG. 9 is a side sectional view of a spoiler assembly, showing the spoiler in the open position.

Spoiler 43 is also connected to spoiler activating mechanism 47, which includes servo mechanism 49, linkage 59 and connecting arm 61. The spoiler activating mechanism 47 functions to pivot spoiler 43, about hinge 55, so that the spoiler 43 moves between open and closed positions. Spoiler shroud 45 may define a travel path for spoiler 43, within the airfoil body 57. The spoiler shroud 45 defines sides 63 and a spoiler receiving seat 51 for receiving and supporting the lower surface portion 43b of spoiler 43. In the presently embodiment, the spoiler shroud 45 extends about three (3) of the four (4) sides of aperture 19, such that when the spoiler 43 translates to the open position, the spoiler shroud 45 and the spoiler 43 define a substantially a wedge shaped cavity 29 within the airfoil body 57. FIG. 7 provides a bottom perspective view of the spoiler assembly 40, with the spoiler disposed in the closed position. FIG. 8 provides a bottom perspective view of the spoiler assembly 40, with the spoiler 43 disposed in an open position. FIG. 9 provides a sectional view of the spoiler assembly 40, with the spoiler 43 disposed in the open position.

As previously noted, the spoiler assembly of the present invention has application in relation to various types of airfoils including manned aircraft, UAVs, and other flight vehicles where selective, temporary modification of lift characteristics is useful. Moreover, it is to be understood that the particular construction of the spoiler, the manner of mounting the spoiler to the vehicle, and the manner of translating the spoiler relative to the spoiler aperture are features that can be varied in accordance with the construction and requirements of the vehicle, without departing from the broader scope and spirit of the present invention.

What is claimed is:

1. An unmanned aerial vehicle (UAV), the UAV defining a UAV blended wing body having a center body portion and outboard wing portions, a UAV outer surface, a UAV inner surface, a UAV upper surface and ailerons disposed along a trailing edge of the UAV outer surface, the UAV upper surface defining first and second spoiler apertures formed therein, the UAV comprising:
 a spoiler assembly for reducing lift of the UAV, the spoiler assembly including:
  first and second spoilers disposed along the UAV upper surface of the center body portion upstream of the ailerons, each spoiler being translatably connected to the UAV inner surface adjacent a first portion of an associated spoiler aperture, the spoilers each defining a spoiler upper surface and a spoiler lower surface, the spoiler upper surfaces being substantially the same size and shape as the spoiler apertures;
  first and second spoiler shrouds connected to the UAV inner surface, of the shrouds, each spoiler shroud extending within the center body portion of the UAV blended wing body about at least a portion of an associated spoiler aperture; and
  first and second spoiler activating mechanisms disposed within the UAV, each spoiler activating mechanism being secured to the UAV inner surface and connected to an associated spoiler lower surface, the spoiler activating mechanisms being operative to increase the descent angle of the UAV by translating the first and second spoilers from a first position, wherein the first and second spoiler upper surfaces are substantially flush with the UAV outer surface, to a second position, wherein the first and second spoiler upper surfaces are both disposed substantially recessed within the center body portion of the UAV blended wing body.

2. The UAV as recited in claim 1 wherein, when the UAV is in flight, and the spoilers are in the first position, the boundary layer of airflow along the UAV outer surface remains attached thereto.

3. The UAV as recited in claim 2 wherein the spoilers do not significantly disturb airflow across the UAV outer surface when the spoilers are in the first position.

4. The UAV as recited in claim 2 wherein the UAV outer surface defines a low observable surface when the spoilers are in the first position.

5. The UAV as recited in claim 1 wherein, when the UAV is in flight, and the spoilers are in the second position, an airflow perturbation results along the UAV outer surface adjacent the spoiler apertures, causing the flow to separate from the top of the airfoil and a resulting reduction in lift of the UAV outer surface aft of the spoiler apertures.

6. The UAV as recited in claim 5 wherein when the first and second spoilers are disposed in the second position, each of the substantially wedge-shaped cavities within the center body portion of the UAV blended wing body disturbs the airflow across the UAV outer surface to reduce lift of the UAV outer surface.

7. The UAV as recited in claim 5 wherein when the spoilers translate to the second position, the spoiler upper surfaces do not extend into airflow across the UAV outer surface portion.

8. The UAV as recited in claim 5 wherein translation of the spoilers into the center body portion of the UAV blended wing body results in a controlled aerodynamic stall condition to occur over a portion of the UAV outer surface aft of the spoilers.

9. The UAV as recited in claim 1 wherein the spoilers are each hingedly connected to the UAV inner surface about a first side of the spoiler apertures, and each spoiler shroud is connected to the UAV inner surface about second, third and fourth sides of the associated spoiler aperture.

10. The spoiler assembly as recited in claim 9 wherein when the first and second spoilers are disposed in the second position, each spoiler and associated spoiler shroud collectively define a substantially wedge-shaped cavity within the center body portion of the UAV blended wing body.

11. The spoiler assembly as recited in claim 1 wherein each spoiler shroud defines a spoiler receiving seat such that, when the spoilers are in the second position, each spoiler lower surface is substantially disposed against and supported by the associated spoiler receiving seat.

12. The UAV as recited in claim 1 further comprising a UAV flight control computer disposed within the UAV blended wing body and in electrical communication with the spoiler activating mechanisms, the flight control computer being operative to regulate the translation of the spoilers.

13. The UAV as recited in claim 1 wherein the UAV outer surface defines a low observable surface when the spoilers are in the second position.

14. The UAV as recited in claim 1 wherein the spoilers each define a non-porous upper surface.

15. The spoiler assembly as recited in claim 1 wherein one of the spoilers, a spoiler shrouds, and spoiler activating mechanisms is disposed on opposing portions of airfoil body, the spoiler activating mechanisms being operative to translate both spoilers from the first position to the second position, to reduce the decent angle of the airfoil.

16. A spoiler assembly engageable to an airfoil for reducing lift of the airfoil, the airfoil defining an airfoil body, an airfoil outer surface and an airfoil inner surface, the airfoil outer surface defining first and second spoiler apertures formed therein, the spoiler assembly comprising:
first and second spoilers, each spoiler being translatably connected to the airfoil inner surface adjacent a first portion of an associated spoiler aperture, each spoiler defining a spoiler upper surface and a spoiler lower surface, the spoiler upper surface being substantially the same size and shape as the associated spoiler aperture;
first and second spoiler shrouds, each shroud being connected to the airfoil inner surface and extending within the airfoil body about at least a portion of an associated spoiler aperture; and
first and second spoiler activating mechanisms, each spoiler activating mechanism being secured to the airfoil inner surface and connected to an associated spoiler lower surface, the spoiler activating mechanisms being translatable into the spoiler shrouds to reduce lift of the airfoil by translating the spoilers between a first position, wherein the spoiler upper surfaces are both substantially flush with the airfoil outer surface, and a second position, wherein the spoiler upper surfaces are both recessed within the shroud, thereby reducing lift of the airfoil.

17. The spoiler assembly as recited in claim 16 wherein translation of the spoilers into the airfoil body results in a controlled aerodynamic stall condition to occur over a portion of the airfoil outer surface aft of the spoilers.

18. The spoiler assembly as recited in claim 16 wherein the airfoil defines a center body portion and wing portions, and the spoiler assembly is disposed on the center body portion.

19. The spoiler assembly as recited in claim 16, wherein the airfoil defines a leading edge and a trailing edge, and the spoiler assembly is disposed intermediate the leading and trailing edge.

20. A method of reducing the descent angle of an aircraft defining an aircraft body, an aircraft outer surface and an aircraft inner surface, the aircraft outer surface defining first and second apertures formed therein the method comprising:
forming first and second spoiler apertures in the aircraft outer surface, the spoilers each defining an upper surface;
connecting a translatable spoiler to the aircraft inner surface adjacent each of the spoiler apertures, the spoilers being substantially the same size and shape as the spoiler apertures; and
reducing the lift of the aircraft by translating the spoilers between a first position wherein the spoilers are substantially flush with the aircraft outer surface, to a second position wherein the spoilers are at least partially recessed within the aircraft body, thereby increasing the descent angle of the aircraft.

21. The method as recited in the claim 20 wherein the step of translating the spoilers to the second position comprises creating an airflow perturbation along the aircraft outer surface adjacent the spoiler apertures.

22. The method as recited in claim 21 wherein the airflow perturbation reduces lift of the aircraft.

23. The method as recited in claim 20 wherein the step of translating the spoilers to the second position comprises disturbing airflow across the aircraft outer surface to reduce lift characteristics of the aircraft.

24. The method as recited in claim 20 wherein the step of translating the spoilers to the second position reduces the lift of the aircraft to enable the aircraft to achieve a steeper descent angle to land.

25. The method as recited in claim 20 wherein the step of translating the spoilers between the first and second positions defines a cavity within the aircraft body, the lower surface of the cavity being substantially defined by the upper surfaces of the spoiler.

26. The method as recited in claim 25 further comprising the step of forming a shroud within the aircraft body, about the spoiler aperture, the shroud defining sidewalls of the cavity.

27. An unmanned aerial vehicle (UAV), the UAV defining a UAV blended wing body, a UAV outer surface, a UAV inner surface, a UAV upper surface and ailerons disposed along a trailing edge of the UAV outer surface, the UAV upper surface defining first and second spoiler apertures formed therein, the UAV comprising:
a spoiler assembly for reducing lift of the UAV, the spoiler assembly including:
first and second spoilers disposed along the UAV upper surface upstream of the ailerons, each spoiler being translatably connected to the UAV inner surface adjacent a first portion of an associated spoiler aperture, the spoilers each defining a spoiler upper surface and a spoiler lower surface, the spoiler upper surfaces being substantially the same size and shape as the spoiler apertures;
first and second spoiler shrouds, each spoiler shroud being disposed within the UAV blended wing body about at least a portion of an associated spoiler aperture; and first and second spoiler activating mechanisms disposed within the UAV, each spoiler activating mechanism being disposed within the UAV blended wing body and connected to an associated spoiler lower surface, the spoiler activating mechanisms being operative to increase the descent angle of the UAV by translating the spoilers from a first position, wherein the upper surfaces of the spoilers are substantially flush with the UAV outer surface, to a second position, wherein the spoiler upper surfaces of the spoilers are recessed within the UAV blended wing body to form a cavity within the UAV blended wing body, the cavity being substantially defined by the shroud and the upper surface of the spoilers.

* * * * *